United States Patent
Kim

(10) Patent No.: US 7,898,567 B2
(45) Date of Patent: Mar. 1, 2011

(54) TRANSMITTING IMAGE USING MOBILE TERMINAL

(75) Inventor: Jong-Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 748 days.

(21) Appl. No.: 11/299,193

(22) Filed: Dec. 9, 2005

(65) Prior Publication Data

US 2006/0128407 A1    Jun. 15, 2006

(30) Foreign Application Priority Data

Dec. 9, 2004    (KR) .................. 10-2004-0103620

(51) Int. Cl.
H04N 7/14 (2006.01)
H04N 5/232 (2006.01)
H04M 1/00 (2006.01)

(52) U.S. Cl. .............. 348/14.12; 348/211.1; 348/211.2; 455/550.1; 455/556.1

(58) Field of Classification Search .............. 348/14.12, 348/333.11, 211.1, 211.2; 455/566, 550.1, 455/556.1, 556.2
See application file for complete search history.

(56) References Cited

U.S. PATENT DOCUMENTS

| | | | |
|---|---|---|---|
| 5,991,816 A * | 11/1999 | Percival et al. ............... | 709/247 |
| 6,337,928 B1 * | 1/2002 | Takahashi et al. ............ | 382/236 |
| 6,538,686 B2 * | 3/2003 | Hara et al. ................. | 348/14.12 |
| 6,600,510 B1 * | 7/2003 | Parulski et al. ............ | 348/211.2 |
| 7,027,084 B1 * | 4/2006 | Watanabe ................. | 348/211.2 |
| 2001/0034222 A1 * | 10/2001 | Roustaei et al. ............. | 455/403 |
| 2002/0051223 A1 * | 5/2002 | Izumi et al. ................. | 358/402 |
| 2002/0140851 A1 | 10/2002 | Laksono | |
| 2003/0025808 A1 * | 2/2003 | Parulski et al. ......... | 348/231.99 |
| 2003/0112358 A1 * | 6/2003 | Hamada ................ | 348/333.12 |
| 2003/0182359 A1 * | 9/2003 | Vorchik et al. .............. | 709/203 |
| 2004/0068583 A1 | 4/2004 | Monroe | |
| 2004/0114199 A1 | 6/2004 | Kanno | |
| 2004/0179115 A1 * | 9/2004 | Tomat et al. ............. | 348/231.6 |
| 2005/0052685 A1 * | 3/2005 | Herf et al. .................. | 358/1.15 |
| 2006/0171603 A1 * | 8/2006 | Jung et al. .................. | 382/254 |

FOREIGN PATENT DOCUMENTS

| | | | |
|---|---|---|---|
| EP | 1120968 A1 * | 8/2001 | |
| JP | 9051412 | 2/1997 | |
| JP | 2001350700 | 12/2001 | |
| JP | 2002051382 | 2/2002 | |
| JP | 2002051382 A * | 2/2002 | |
| JP | 2003091485 | 3/2003 | |
| JP | 2004-013352 | 1/2004 | |
| JP | 2004-310706 | 11/2004 | |
| WO | WO 03001770 | 1/2003 | |

* cited by examiner

Primary Examiner — Lin Ye
Assistant Examiner — Mekonnen Dagnew
(74) Attorney, Agent, or Firm — Lee, Hong, Degerman, Kang & Waimey

(57) ABSTRACT

The present invention relates to transmitting an image using a mobile terminal. The present invention comprises selecting at least one image having a predetermined resolution, checking a first size of the at least one image, determining whether the first size of the at least one image exceeds a transmittable size, adjusting the predetermined resolution of at least one of the at least one image if the first size exceeds the transmittable size, wherein the predetermined resolution is adjusted so that a second size of the at least one image does not exceed the transmittable size, and transmitting that at least one image having the second size.

16 Claims, 3 Drawing Sheets

TRANSMITTING IMAGE USING MOBILE TERMINAL

CROSS-REFERENCE TO RELATED APPLICATIONS

Pursuant to 35 U.S.C. §119(a), this application claims the benefit of earlier filing date and right of priority to Korean Application No. 2004-0103620, filed on Dec. 9, 2004, the contents of which is hereby incorporated by reference herein in its entirety.

FIELD OF THE INVENTION

The present invention relates to transmitting images using a mobile terminal, and more particularly, to adjusting a resolution of the images when a size of the images exceeds a permissible value.

BACKGROUND OF THE INVENTION

A Multimedia Message Service (MMS) is a type of information providing service for creating, sending and receiving text, audio and video messages. A Short Message Service (SMS) is a globally accepted service for enabling the transmission of alphanumeric messages between mobile subscribers. Typically, the SMS allows a maximum of 160 characters to be transmitted. The MMS is a combination of the Short Message Service (SMS) and an e-mail service. Overcoming restrictions related to data size of the SMS and existing media, the MMS allows transmission of various multimedia data such as images, sound and multimedia files as well as text.

Recently, as mobile terminals provide the MMS, subscribers can transmit various images and sound, as well as text, at any time and anywhere. As the MMS function is set as part of a basic menu in the mobile terminals, like the SMS, users can easily use the MMS service.

In addition, the mobile terminals include menus such as an 'MMS send menu' and an 'SMS send menu'. Accordingly, one subscriber can send a message including an image (e.g., a photo) or music to another subscriber using the 'MMS send menu'. Upon receiving the message, the other subscriber can immediately check the message similar to the SMS.

However, in the related art, in case of image transmission, if multiples files of photos (e.g., 4 photos) are attached and the size of the attached photos exceeds a transmittable size (e.g., 400 Kbyte), the subscriber cannot send the four files of photos at one time. Thus, the subscriber must separately send the MMS message with the four photos multiple times. This is problematic because the MMS becomes quite inconvenient to use. In addition, because an MMS billing scheme bills (charges) a subscriber of the service according to a case-by-case basis or other per use scheme, the subscriber is charged with relatively high communication fees when the subscriber is required to send multiple MMS messages.

SUMMARY OF THE INVENTION

The present invention is directed to transmitting images using a mobile terminal, wherein a resolution of the images is adjusted for transmission when a size of the images attached in a message exceeds a permissible value.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for transmitting an image using a mobile terminal, the method comprising selecting at least one image having a predetermined resolution, checking a first size of the at least one image, determining whether the first size of the at least one image exceeds a transmittable size, adjusting the predetermined resolution of at least one of the at least one image if the first size exceeds the transmittable size, wherein the predetermined resolution is adjusted so that a second size of the at least one image does not exceed the transmittable size, and transmitting the at least one image having the second size.

Preferably, the method further comprises transmitting an unadjusted image with the at least one image having the second size. Preferably, the method further comprises attaching the at least one image to a message if the second size of the at least one image does not exceed the transmittable size and transmitting the at least one image attached to the message. Preferably, the message is a multimedia message.

In one aspect of the invention, in the adjusting the predetermined resolution step, a resolution of an image with the largest size is adjusted. In the adjusting the predetermined resolution step, a resolution of all images are adjusted. In the adjusting the predetermined resolution step, the resolution of the image is adjusted by lowering the resolution by one level. In the adjusting the predetermined resolution step, a resolution of each image of the at least one image is reduced, starting with an image with the largest size, until the second size does not exceed the transmittable size. Preferably, the adjusting the predetermined resolution step is repeatedly performed until the second size does not exceed the transmittable size.

In a further aspect of the invention, the adjusting the predetermined resolution step comprises adjusting the resolution of the image with the largest size by one level, comparing the second size of the at least one image to be transmitted with the transmittable size, adjusting the resolution level of the image with the largest size until the second size does not exceed the transmittable size, if the first size of the at least one image is greater than the transmittable size, and repeatedly performing the step of comparing the second size until the second size of the at least one image does not exceed the transmittable size.

Preferably, the message is a Multimedia Message Service (MMS) message. The transmittable size is 400 Kbyte. The at least one image comprises at least one of a 1280×960 resolution level, a 640×480 resolution level, and a 80×80 resolution level.

In accordance with another embodiment of the present invention, a mobile communication device for transmitting an image using a mobile terminal comprises means for selecting at least one image having a predetermined resolution, means for checking a first size of the at least one image, means for determining whether the first size of the at least one image exceeds a transmittable size, means for adjusting the predetermined resolution of at least one of the at least one image if the first size exceeds the transmittable size, wherein the predetermined resolution is adjusted so that a second size of the at least one image does not exceed the transmittable size, and means for transmitting the at least one image having the second size.

Preferably, the mobile communication device further comprises means for transmitting an unadjusted image with the at least one image having the second size. Preferably, the mobile communication device further comprises means for attaching the at least one image to a message if the second size of the at least one image does not exceed the transmittable size and means for transmitting the at least one image attached to the message. Preferably, the message is a multimedia message.

In one aspect of the invention, the means for adjusting the predetermined resolution adjusts a resolution of an image with the largest size. The means for adjusting the predetermined resolution adjusts a resolution of all images. The means for adjusting the predetermined resolution adjusts the resolution of the image by lowering the resolution by one level. The means for adjusting the predetermined resolution reduces a resolution of each image of the at least one image, starting with an image with the largest size, until the second size does not exceed the transmittable size. Preferably, the means for adjusting the predetermined resolution repeatedly adjusts the resolution until the second size does not exceed the transmittable size.

In another aspect of the present invention, the means for adjusting the predetermined resolution comprises, means for adjusting the resolution of the image with the largest size by one level, means for comparing the second size of the at least one image to be transmitted with the transmittable size, means for adjusting the resolution level of the image with the largest size until the second size does not exceed the transmittable size, if the first size of the at least one image is greater than the transmittable size, and means for repeatedly performing the step of comparing the second size until the second size of the at least one image does not exceed the transmittable size.

Preferably, the message is a Multimedia Message Service (MMS) message. The transmittable size is 400 Kbyte. The at least one image comprises at least one of a 1280×960 resolution level, a 640×480 resolution level, and a 80×80 resolution level.

In accordance with another embodiment of the present invention, a mobile communication device for transmitting an image using a mobile terminal, comprises a storage unit for storing images, a processing unit adapted to select at least one image having a predetermined resolution, check a first size of the at least one image, determine whether the first size of the at least one image exceeds a transmittable size, and adjust the predetermined resolution of at least one of the at least one image if the first size exceeds the transmittable size, wherein the predetermined resolution is adjusted so that a second size of the at least one image does not exceed the transmittable size, and a transmitter for transmitting the at least one image having the second size.

In one aspect of the invention, the mobile communication device further comprises a display for prompting a user whether to adjust a resolution of an image. The mobile communication device further comprises an RF module comprising a receiver and a transmitter for receiving and transmitting radio signals, an antenna for facilitating transmission and reception of the radio signals, a battery for powering the mobile communication device, a keypad for entering user input, a speaker for outputting audio output of the mobile communication device, and a microphone for entering audio user input. Preferably, the transmitter transmits an unadjusted image with the at least one image having the second size.

In another aspect of the invention, the processing unit attaches the at least one image to a message if the second size of the at least one image does not exceed the transmittable size and the transmitter transmits the at least one image attached to the message. The message is a multimedia message.

Preferably, the processing unit adjusts a resolution of an image with the largest size. The processing unit adjusts a resolution of all images. The processing unit adjusts the resolution of the image by lowering the resolution by one level. The processing unit reduces a resolution of each image of the at least one image, starting with an image with the largest size, until the second size does not exceed the transmittable size. The processing unit repeatedly adjusts the resolution until the second size does not exceed the transmittable size.

In a further aspect of the invention, the processing unit adjusts the resolution of the image with the largest size by one level, compares the second size of the at least one image to be transmitted with the transmittable size, adjusts the resolution level of the image with the largest size until the second size does not exceed the transmittable size, if the first size of the at least one image is greater than the transmittable size, and repeatedly performs the step of comparing the second size until the second size of the at least one image does not exceed the transmittable size.

Preferably, the message is a Multimedia Message Service (MMS) message. The transmittable size is 400 Kbyte. The at least one image comprises at least one of a 1280×960 resolution level, a 640×480 resolution level, and a 80×80 resolution level.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to transmitting images using a mobile terminal.

Figure 1:
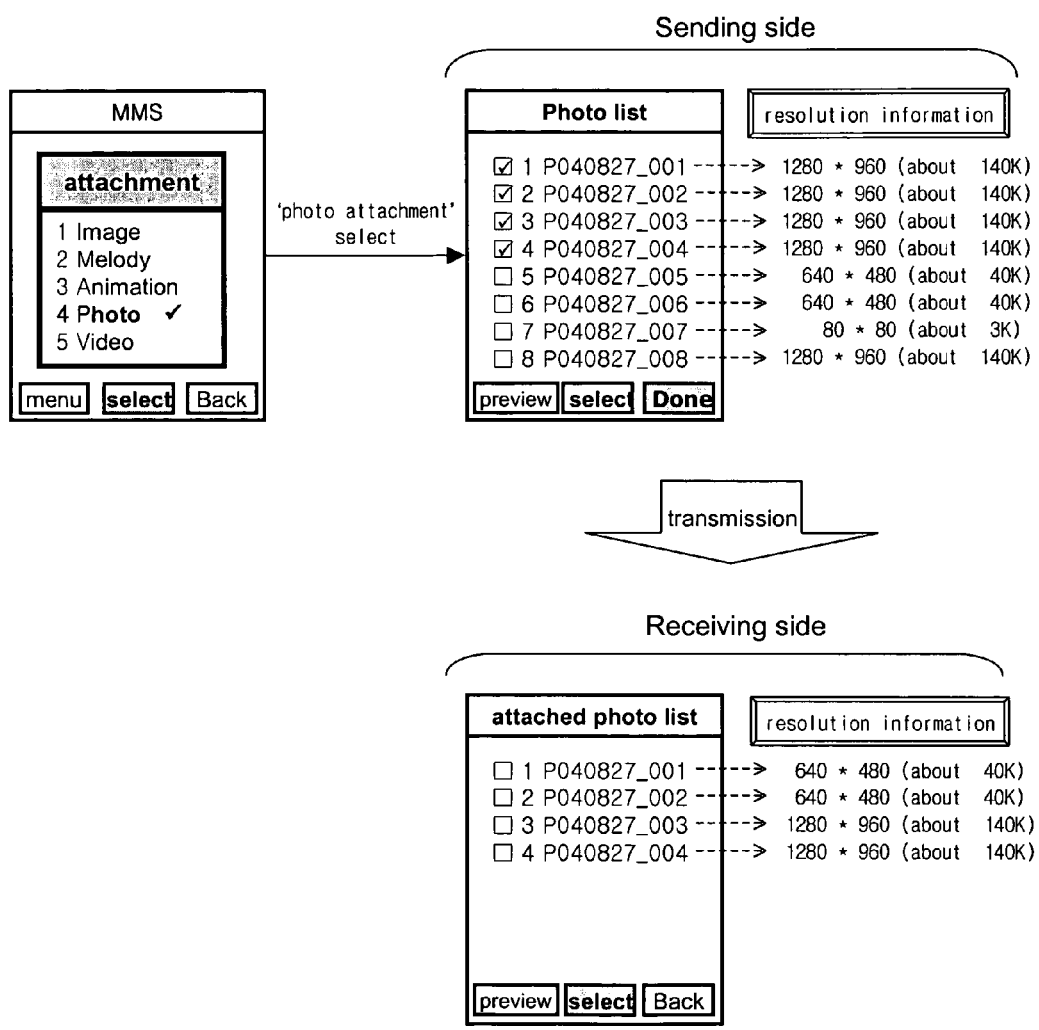
FIG. 1 illustrates a process of manipulating a mobile terminal in accordance with a preferred embodiment of the present invention.
Figure 2:
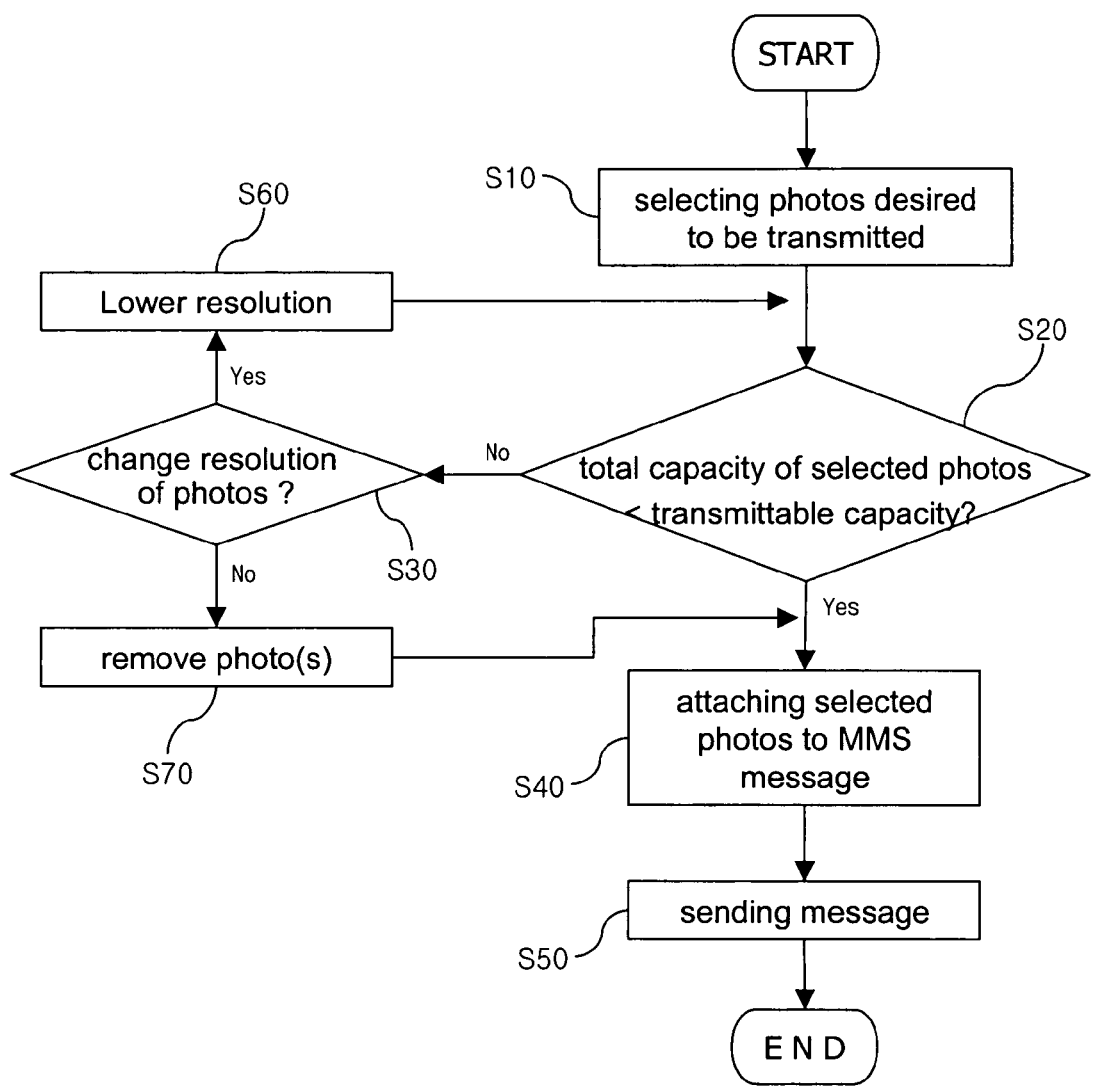
FIG. 2 is a flow chart of an image transmission procedure in accordance with the preferred embodiment of the present invention.

A preferred embodiment of the present invention will now be described with reference to the accompanying drawings. FIG. 1 illustrates a process of manipulating a mobile terminal in accordance with a preferred embodiment of the present invention. FIG. 2 is a flow chart of an image transmission procedure in accordance with the preferred embodiment of the present invention.

Referring to FIG. 1, when a subscriber completes inputting the content of a message to be transmitted into a mobile terminal, the subscriber may move to a 'file attachment' menu of the mobile terminal. In the 'file attachment' menu, the subscriber may select a 'photo attachment' menu, which is a lower menu of the 'file attachment' menu. Upon selecting the 'photo attachment' menu, a list of photos stored in the mobile terminal is displayed on a screen of the mobile terminal.

Referring to FIG. 2, the subscriber may select photos desired to be transmitted from the photo list (step S10) and finalize the selection by inputting a complete key to the mobile terminal. The mobile terminal then calculates the total size of the selected photos and checks whether the calculated size exceeds a transmittable size (referred to hereinafter as 'allowable size') (step S20). If the total size of the selected photos does not exceed the allowable size, such as 400 Kbyte, for example, then the selected photos are attached to an MMS message and transmitted to a terminal of a receiver (steps S40 and S50).

If, however, the total size of the selected photos exceeds the allowable size, the mobile terminal outputs a message asking the subscriber whether to change the resolution of the photos on the screen and waits for an instruction ('Yes' or 'No') from the subscriber (step S30).

If the user instructs the mobile terminal to change the resolution ('Yes'), the mobile terminal checks the size of the selected photos and lowers the resolution of an image, such as the one with the largest memory size by one or more levels (step S60). Alternatively, the user may select one of the images for downsizing. Preferably, the resolution of the photo is lowered such that an image integrity is preserved. That is, the entire image, or at least most of the original features of the image remain after the resolution is lowered, as opposed to cropping the image or sending an incomplete image in order to reduce its size.

If the user instructs the mobile terminal not to change the resolution ('No'), then the mobile terminal may remove at least one of the selected photos for transmission in order to achieve a total size less than the transmittable size (step S70). The mobile terminal may remove the photo according to a random selection or a user preference, for example.

In accordance with this embodiment, it is preferable that the resolutions of photos be divided into three levels, namely, a resolution of 1280×960 (the number of horizontal pixels× the number of vertical pixels), a resolution of 640×480, and a resolution of 80×80. Moreover, it is preferred that the size of a photo with the resolution of 1280×960 is approximately 140 Kbyte, the size of a photo with the resolution of 640×480 is approximately 40 Kbyte, and the size of a photo with the resolution of 80×80 is approximately 3 Kbyte. However, it is contemplated that the resolutions of photos may be divided into any number of levels having various resolutions, wherein the size of each resolution is also variable.

For example, if four photos (photo 1 photo~4) are selected to be attached to an MMS message and all the photos have the resolution of 1280×960 with the size of 140 Kbyte, the total size of the selected photos is approximately 560 Kbyte (140 Kbyte×4). In this case, because the total size of the photos exceeds the allowable size of 400 Kbyte, the mobile terminal lowers the resolution of photo 1 by one level. Preferably, the resolution is lowered to 640×480 with the size of 40 Kbyte by a downsampling method. However, various other methods may be used in accordance with the present invention, such as nearest neighbor, bilinear, bicubic, bicubic smoother, bicubic sharper and anti-aliasing filter, for example.

Accordingly, the total size of the selected photos ((40 Kbyte×1)+(140 Kbyte×3)=460 Kbyte) exceeds the allowable size of 400 Kbyte. Because the total size of the selected photos still exceeds the allowable size of 400 Kbyte of the mobile terminal, the resolution of photo 2 is lowered by one level to the resolution of 640×480 with the size of 40 Kbyte. The total size of the selected photos ((40 Kbyte×2)+(140 Kbyte×2)=360 Kbyte) is then checked again. In this case, because the total size (360 Kbyte) of the selected photos does not exceed the allowable size of 400 Kbyte of the mobile terminal, the mobile terminal attaches the selected photos (photo 1~photo 4) to the MMS message, and transmits the message to the terminal of the receiver (steps S40 and S50).

In accordance with another embodiment of the present invention, if the total size of the selected photos exceeds the allowable transmission capacity, the mobile terminal lowers the resolution of all selected photos. For example, the resolution of all photos may be lowered such that each photo has the same size. In another example, all photos may be lowered by an equal amount. In both scenarios, the sizes of all photos are lowered until their total size is less than the allowable transmission capacity.

In accordance with the present invention, if the total size of the selected photos exceeds the allowable size, it is preferred that the mobile terminal display a notification message such as 'selected photos exceed transmittable size' on the screen. Furthermore, in the step S30, it is preferred that the mobile terminal display a notification message such as 'Do you want to convert the resolution according to transmittable size?' on the screen. When the subscriber instructs the mobile terminal to change ('Yes') the resolution of the image in response to the notification message, the mobile terminal preferably displays the list of stored photos on the screen again, so that the subscriber may change the selection of the photos.

As so far described, the method for transmitting images of the mobile terminal in accordance with the present invention has the following advantages. For example, if the size of photos desired to be transmitted exceeds the transmittable size of the mobile terminal, the resolution of the selected photos is automatically converted suitably according to the transmittable size. Therefore, the user does not need to send the attached photos multiple times when the transmittable size of the mobile terminal is exceeded. Accordingly, the user is charged less for using the MMS service under an MMS charge scheme which charges the user according to a case-by-case basis or other per use scheme.

Figure 3:
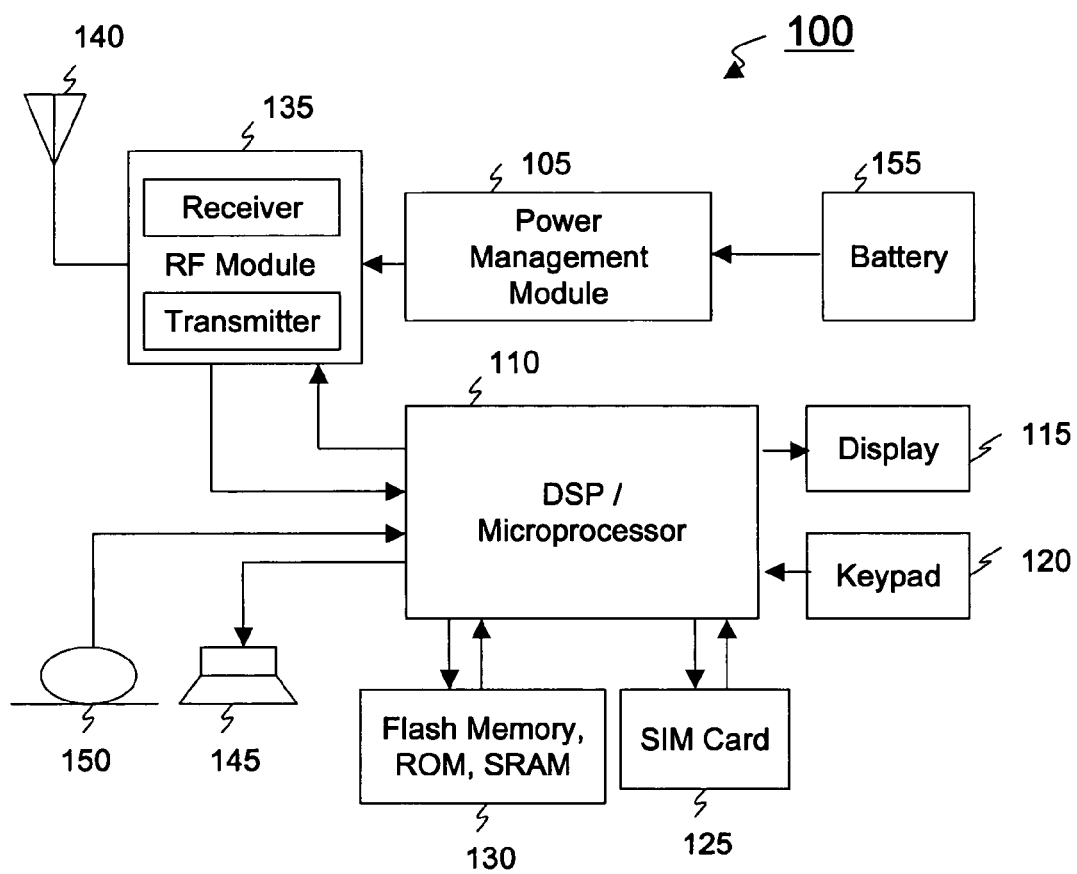
FIG. 3 illustrates a mobile terminal for performing methods in accordance with the preferred embodiment of the present invention.

Referring to FIG. 3, a block diagram of a mobile communication device 100 of the present invention is illustrated, for example a mobile phone for performing the methods of the present invention. The mobile communication device 100 comprises a processing unit 110 such as a microprocessor or digital signal processor, an RF module 135, a power management module 105, an antenna 140, a battery 155, a display 115, a keypad 120, a storage unit 130 such as flash memory, ROM or SRAM, a speaker 145 and a microphone 150. A SIM card 125 is optional.

A user enters instructional information, such as a telephone number, for example, by pushing the buttons of a keypad 120 or by voice activation using the microphone 150. The processing unit 110 receives and processes the instructional information to perform the appropriate function, such as to dial the telephone number. Operational data may be retrieved from the storage unit 130 to perform the function. Furthermore, the processing unit 110 may display the instructional and operational information on the display 115 for the user's reference and convenience.

The processing unit 110 issues instructional information to the RF module 135, to initiate communication, for example, transmit radio signals comprising voice communication data. The RF module 135 comprises a receiver and a transmitter to receive and transmit radio signals. The antenna 140 facilitates the transmission and reception of radio signals. Upon receiving radio signals, the RF module 135 may forward and convert the signals to baseband frequency for processing by the processing unit 110. The processed signals would be transformed into audible or readable information outputted via the speaker 145, for example.

The processing unit 110 is adapted to store message history data of messages received from and messages transmitted to other users in the storage unit 130, receive a conditional request for message history data input by the user, process the conditional request to read message history data corresponding to the conditional request from the storage unit, and output the message history data to the display unit 115. The storage unit 130 is adapted to store message history data of the received messages and the transmitted messages.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method to facilitate data transmission in a mobile terminal, the method comprising: generating a single message for transmitting via a wireless messaging service responsive to user input, wherein the message comprises a multimedia messaging service (MMS) message;
displaying on a display of the mobile terminal a list identifying a plurality of images which are stored in memory of the mobile terminal, wherein each identified image of the list comprises an associated resolution, and wherein each identified image of the list is a separate file comprising a file size;
identifying, responsive to further user input, an image group for transmitting in association with the single message, wherein the image group comprises at least one image identified in the list, and wherein the displaying of the list occurs simultaneously with the identifying of the image group, permitting the user to individually select, via the further user input, any of the plurality of images identified in the list to identify which image or images are included in the image group;
calculating a total size of the image group, the total size based upon a collective total of the file size of each separate file of each image included in the image group; and
automatically adjusting, at the mobile terminal, the resolution of at least one image of the image group if the total size exceeds a size threshold, the adjusting occurring prior to the transmitting of the image group resulting in an adjusted total size of the image group being less than the size threshold, threshold; and
maintaining the resolution of at least one other image of the image group even if the total size exceeds the size threshold and the adjusting of the resolution is performed for the at least one image of the image group.

2. The method according to claim 1, wherein the image group comprises a plurality of images identified in the list, and wherein the adjusting comprises adjusting the resolution of all images of the image group if the total size exceeds a size threshold.

3. The method according to claim 1, wherein the image group comprises a plurality of images identified in the list, and wherein the adjusting comprises adjusting the resolution of only one image of the plurality of images of the image group if the total size exceeds a size threshold.

4. The method according to claim 1, wherein the image group comprises a plurality of images identified in the list, and wherein the adjusting comprises adjusting the resolution of less than all of the plurality of images of the image group if the total size exceeds a size threshold.

5. The method according to claim 1, further comprising:
attaching the at least one image of the image group to the message; and
performing the transmitting of the message and the attached image group.

6. The method according to claim 1, wherein the size threshold comprises an allowable size for the transmitting of the image group.

7. The method according to claim 1, wherein the memory comprises flash memory or static random access memory (SRAM).

8. The method according to claim 1, further comprising:
storing history data relating to previously transmitted messages in the memory.

9. The method according to claim 1, wherein the resolution of each image identified in the list is related to a size of the image.

10. A mobile terminal, comprising: a body; a transmitter coupled to the body and being configured to transmit a message via a wireless messaging service responsive to user input, wherein the message comprises a multimedia messaging service (MMS) message; a memory; a display coupled to the body and being configured to display a list identifying a plurality of images which are stored in the memory, wherein each identified image of the list comprises an associated resolution, and wherein each identified image of the list is a separate file comprising a file size; and
a processor that:
identify, responsive to further user input, an image group for transmitting in association with the message, wherein the image group comprises at least one image identified in the list, and wherein the displaying of the list occurs simultaneously with the identifying of the image group;
permit the user to individually select, via the further user input, any of the plurality of images identified in the list to identify which image or images are included in the image group;
calculates a total size of the image group, the total size based upon a collective total of the file size of each separate file of each image included in the image group; and
automatically adjusts the resolution of at least one image of the image group if the total size exceeds a size threshold, the adjusting occurring prior to the transmitting of the image group resulting in an adjusted total size of the image group being less than the size threshold, threshold; and
maintains the resolution of at least one other image of the image group even if the total size exceeds the size threshold, and to perform the adjusting of the resolution for the at least one image of the image group.

11. The mobile terminal according to claim 10, wherein the image group comprises a plurality of images identified in the list, and wherein the adjusting performed by the processor comprises adjusting the resolution of all images of the image group if the total size exceeds a size threshold.

12. The mobile terminal according to claim 10, wherein the image group comprises a plurality of images identified in the list, and wherein the adjusting performed by the processor comprises adjusting the resolution of only one image of the plurality of images of the image group if the total size exceeds a size threshold.

13. The mobile terminal according to claim 10, wherein the image group comprises a plurality of images identified in the list, and wherein the adjusting performed by the processor comprises adjusting the resolution of less than all of the plurality of images of the image group if the total size exceeds a size threshold.

14. The mobile terminal according to claim 10, wherein the size threshold comprises an allowable size for the transmitting of the image group.

15. The mobile terminal according to claim 10, wherein the memory comprises flash memory or static random access memory (SRAM).

16. The mobile terminal according to claim 10, wherein the processor is further configured to:
    store history data relating to previously transmitted messages in the memory.

* * * * *